US012777247B1

(12) United States Patent
Park et al.

(10) Patent No.: US 12,777,247 B1
(45) Date of Patent: Oct. 27, 2026

(54) TECHNIQUES FOR ADJUSTING FOCUS OF A CAMERA USING MACHINE VISION

(71) Applicant: Amazon Technologies, Inc., Seattle, WA (US)

(72) Inventors: Yongwoo Park, Seattle, WA (US); James C Curlander, Lafayette, CO (US); Brice Jamieson, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 18/620,568

(22) Filed: Mar. 28, 2024

(51) Int. Cl.
*H04N 23/67* (2023.01)

(52) U.S. Cl.
CPC .................................. *H04N 23/67* (2023.01)

(58) Field of Classification Search
None
See application file for complete search history.

(56) References Cited

U.S. PATENT DOCUMENTS

| | | | | |
|---|---|---|---|---|
| 5,473,736 A * | 12/1995 | Young | G06T 11/001 | 358/518 |
| 2003/0222998 A1* | 12/2003 | Yamauchi | G06T 5/20 | 348/262 |
| 2007/0116450 A1* | 5/2007 | Kijima | G03B 7/095 | 348/E5.04 |
| 2008/0074529 A1* | 3/2008 | Terashima | H04N 23/675 | 382/286 |
| 2013/0259459 A1* | 10/2013 | Mick | G03B 13/36 | 396/121 |
| 2014/0204231 A1* | 7/2014 | Takahara | H04N 23/673 | 348/220.1 |
| 2015/0022706 A1* | 1/2015 | Jogetsu | G03B 17/20 | 348/333.09 |
| 2020/0154026 A1* | 5/2020 | Yu | H04N 23/71 | |
| 2025/0324166 A1* | 10/2025 | Huang | H04N 1/6033 | |

FOREIGN PATENT DOCUMENTS

| | | | | |
|---|---|---|---|---|
| KR | 100609670 B1 * | 8/2006 | H04N 23/55 | |
| WO | WO-2024111366 A1 * | 5/2024 | H04N 23/67 | |

OTHER PUBLICATIONS

Title: Translation of KR 10060970B1 Author: Park Date: Aug. 8, 2006 (Year: 2006).*

* cited by examiner

*Primary Examiner* — Twyler L Haskins
*Assistant Examiner* — Wesley J Chiu
(74) *Attorney, Agent, or Firm* — Kilpatrick Townsend & Stockton LLP

(57) ABSTRACT

Techniques for adjusting focus of a camera using machine vision are described herein. A set of red-blue-green (RGB) pixel arrays of a target image can be received via a camera. Each RGB pixel array of the set of RGB pixel arrays can correspond to a different focus value of the camera. A set of hue-saturation-value (HSV) pixel arrays of the target image can be generated based at least in part on the set of RGB pixel arrays. An average saturation value can be determined for each HSV pixel array of the set of HSV pixel arrays. A first HSV pixel array of the set of HSV pixel arrays can be determined to correspond to a target saturation value. The focus value of the camera can be adjusted based at least in part on a corresponding RGB pixel array that corresponds to the first HSV pixel array.

20 Claims, 9 Drawing Sheets

TECHNIQUES FOR ADJUSTING FOCUS OF A CAMERA USING MACHINE VISION

BACKGROUND

Due to the characteristics of lenses and image sensors, settings of a camera may need to be changed in order to properly capture an image of a particular subject. The aperture of the camera and the focal length of the camera are some of the camera settings that can be modified to properly capture an image with acceptable depth of field and focus.

BRIEF DESCRIPTION OF THE DRAWINGS

Various embodiments in accordance with the present disclosure will be described with reference to the drawings, in which.

DETAILED DESCRIPTION

Figure 1:
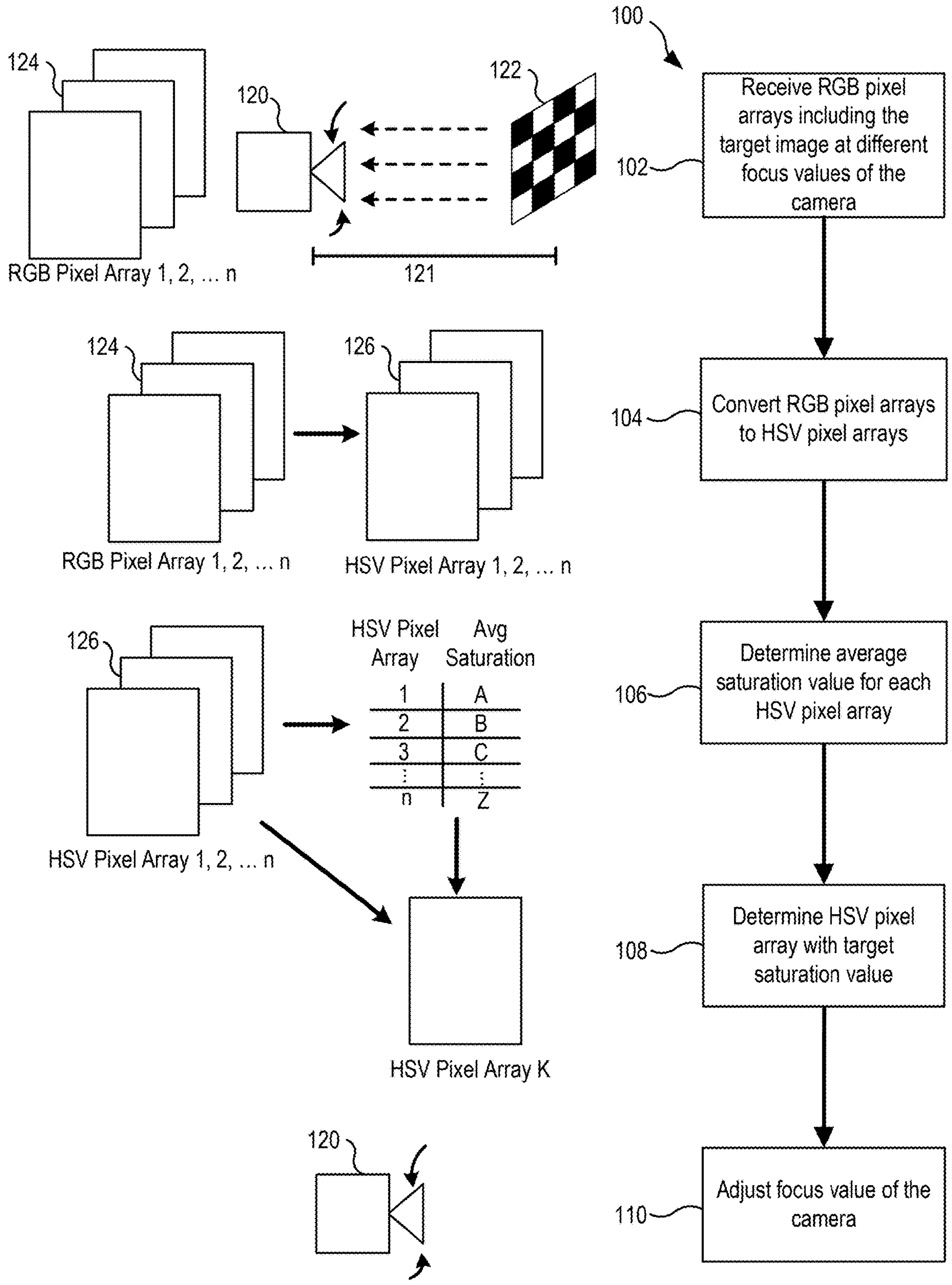
FIG. 1 illustrates an example flow diagram for adjusting the focus of a camera, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples are disclosed directed to, among other things, methods, systems, devices, and computer-readable storage media (collectively, techniques) for adjusting camera settings, such as focus and aperture, to have acceptable camera settings based on the regions of interest in the captured image, such as depth of field and focus. Acceptable camera settings can capture images with a desired level of detail regarding the subjects and objects in the image. Adjusting camera settings to have proper depth of field and focus can be difficult. Proper depth of field can be used to have particular subjects and objects in the image within a focus and desired level of detail. Photographers understand how to adjust camera settings based on their extensive experience with cameras and generating images with proper focus and depth of field with regards to subjects of the images. The techniques described herein include adjusting camera settings to have proper depth of field and focus for a particular working distance using computer vision as opposed to requiring a photographer with extensive experience. Some cameras can have a fixed-focus imaging lens that needs to be adjusted or changed in order to affect camera settings such as field-of-view, depth-of-focus, and depth-of-field. The techniques described herein use color aliasing effects in digital imaging to determine the proper focus value for a camera (for example, a focal length). The proper focus value for a camera can create a color aliasing effect for black-and-white target images with small features close to the imaging resolution of the camera. The color-aliasing effect can produce color-based artifacts on the aliased patterns when the Red-Green-Blue (RGB) de-mosaicing algorithm of the camera is applied to determine the color of each pixel of image captured by the camera. The image captured by the camera can be converted from an RGB image to a Hue-Saturation-Value (HSV) image. The saturation for each pixel (also referred to as saturation value) of the image can indicate the strength of the color-aliasing of the image captured by the camera. When the camera is at proper focus on the target, the color-aliasing in the image captured by the camera (the camera's image) will be the strongest such that the saturation of the colors will be at the highest value. Thus, the camera's image of target image with the highest average saturation value indicates that the camera is at the proper focus value.

The techniques described herein for adjusting focus values and aperture values based on color-aliasing and the use of an HSV image has numerous advantages. Measuring focus by color saturation can be insensitive to image brightness. In an HSV image, the brightness value (corresponding to the "Value" of Hue-Saturation-Value) is orthogonal to the hue (also referred to as hue value) and saturation value for each pixel of the HSV image. Thus, the saturation value is not influenced by an image being too bright or too dim. Additionally, measuring focus by color saturation can be insensitive to image noise. Using an average saturation value (also referred to as a mean saturation value) for an image can suppress the effects of image noise. Image noise tends to be a white noise of equal intensity at different frequencies. Using an average saturation value for an image can suppress the effects of the image noise. Furthermore, the color-aliasing effect is related to the resolution of the camera sensor and the target image feature frequency such that digital zoom does not affect whether the color-aliasing is detected in the camera's image. Conventional methods for adjusting focus values and aperture values can use sharpness as a measure of focus indicator. However, using sharpness as a measure of focus indicator does not have any of the above advantages. Instead, using sharpness as a measure of focus indicator degrades based on image noise. Similarly, sharpness as a measure of focus is dependent on proper illumination of the target image. Additionally, using sharpness as a measure of focus can require that the camera be zoomed in to allow the computer vision (or photographer) to identify features in the target image and how the features are affected as the focus value of the camera is adjusted.

In one example, a camera can be configured to set a focus value at a working distance from the camera. The target image can be placed at the working distance from the camera within the camera's field-of-view. The camera's field-of-view can extend beyond the target image. The target image can be a checkerboard with a frequency that is slightly different than the resolution of the camera sensor to produce the aliasing effect. For example, the checkerboard can be 150 rows and 150 columns (for example, 150 by 150) while the resolution of the camera for the corresponding part of the camera's image can be 142 by 142 pixels. The mismatch in the frequency of the elements of the checkerboard and the resolution of can cause an interference pattern that is different from the actual checkerboard of the target image. The interference pattern can be generated due to the effects of aliasing.

While the target image is within the field-of-view of the camera, the focus value (for example, a focal length) of the camera can be set at a minimum value. Then the focus value of the camera can be slowly changed over time to the maximum value. The camera can capture images (also referred to as frames) at the various focus values of the camera. The frames are captured in the format of RGB pixel arrays. This is because the camera sensor is designed to determine the RGB values for a pixel of the camera's image using a color filter. Color filters oftentimes use RGB-based filters such as the Bayer's filter. The RGB pixel arrays of the frames can be converted into an HSV pixel array via a conversion algorithm. An average saturation value can be determined for each HSV pixel array. The HSV pixel array with the greatest average saturation value corresponds to the RGB pixel array that was captured at the proper focus value of the camera and thus the proper focus value of the camera.

Of note, the focus adjustment procedure described herein can be handled frame by frame from a live stream. For example, the camera can capture an RGB pixel array of the target image at a first focus value and the focus adjustment computer system (whether on the camera or on a connected computing device) can convert the RGB pixel array into an HSV pixel array and determine saturation values while the camera captures the another RGB pixel array at a second focus value. In this way, the RGB pixel arrays of the target image can be captures in a live stream such that the RGB pixel arrays are generated frame by frame from the live stream at an interval. The following image process can be implemented in real time with each frame using the computer vision algorithms herein before the next frame is generated by the camera. The focus procedure can adjust the lens focus while getting the real-time feedback of the average saturation value at the camera's frame rate. Thus, the focus value of the camera can then be adjusted to the proper focus to the target image.

FIG. 1 illustrates a flow diagram 100 of techniques relating to adjusting the focus of a camera as described herein. The process of adjusting the focus value of the camera 120 can be referred to as training. At a high level, a camera 120 can be configured to include a target image 122 in the field-of-view of the camera 120. The camera 120 has a fixed focal value that can be changed in order to identify an optimal focus value for a particular working distance 121. The working distance 121 can be the distance from the camera (for example, the camera lens) to the middle of an object or location that is the target to be captured in an image by the camera 120. For example, the working distance 121 can be the distance from the camera 120 to the middle depth-of-field for the object that is the target to be captured in an image by the camera 120. In a more particular example, the object can be a container or space and the working distance 121 can be the distance from camera 120 to the center of the container or space. The camera 120, using an image sensor, can generate a set of Red-Green-Blue (RGB) pixel arrays 124 of which at least a portion of each RGB pixel array of the RGB pixel arrays 124 includes an image of the target image 122. Each RGB pixel array of the RGB pixel arrays 124 can be associated with a different focus value of the camera 120. The RGB pixel arrays 124 can be captured at an interval of a given frame rate. In this way, the process can be considered real-time image processing that potentially provides a real-time quantitative focus value feedback. The lens focus adjustment process can be a gradual change of focus with real-time observation of image which can be the output of the image processing at the given time. In this way, the RGB pixel arrays 124 are gradually generated for at least a portion of the total focus values of the camera. The total focus values of the camera can range from a minimum focus value (for example, a minimum focal length) up to a focus value roughly equivalent to infinity (for example, a focal length of infinity). However, a focus value of infinity is a theoretical infinity and in reality corresponds to a comparatively large distance from the minimal focus value. The focus value of the camera can also be referred to as a focal length of the camera or a focal value of the camera. The focal length of the camera can refer to the effective focal length of the camera, the focal length of the lens of a single lens camera, or a compound focal length related to an effective focal length of a set of lens in the camera. A set of Hue-Saturation-Value (HSV) pixel arrays 126 can be generated based on the RGB pixel arrays 124. The HSV pixel arrays 126 can have a one-to-one correspondence with the RGB pixel arrays 124. Any suitable algorithm can be used to convert the RGB pixel arrays 124 into HSV pixel arrays 126. An average saturation value of the region-of-interest within the image field of view can be determined for each HSV pixel array. In some examples, the RGB pixel array 124 can be limited to the region-of-interest related to the captured image of the camera (for example, the region-of-interest can correspond to the portions of the captured image that relate to the target image). An HSV pixel array with a target saturation value can be identified. In some examples, the target saturation value is the highest average saturation value for an HSV pixel array of the set of HSV pixel arrays 126.

The training process described herein can normalize the scale of the average saturation values for the HSV pixel arrays so that the best focus of the camera can be determined. The normalization can enable focus adjustment capability for the camera in addition to searching for the best focus of the camera. The training can also determine target saturations for other different distances with specific normalized saturation values so that a fixed depth-of-field can be set. To obtain the normalization, the minimum and the maximum average saturation values for the full range of focus values of the camera can be determined for obtaining the saturation scale.

Some or all of the process associated with flow diagram 100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Likewise, some or all of the process associated with flow diagram 100 can involve a technician causing the operations to occur. For example, a technician can adjust the focus value of the camera.

At 102, training the camera can begin with the camera 120 being configured to generate RGB pixel arrays 124 at different focus values of the camera 120 where in the image of the camera (the image generated by the camera and/or computer system, also referred to as the camera's image) can include the target image 122. The target image 122 can be a repeating pattern. For example, the target image 122 can be a black and white checkerboard. However, other repeating patterns can also be used such repeated lines of black and white. In some examples, the RGB pixel arrays 124 only include the pixels captured related to the target image 122.

Figure 2:
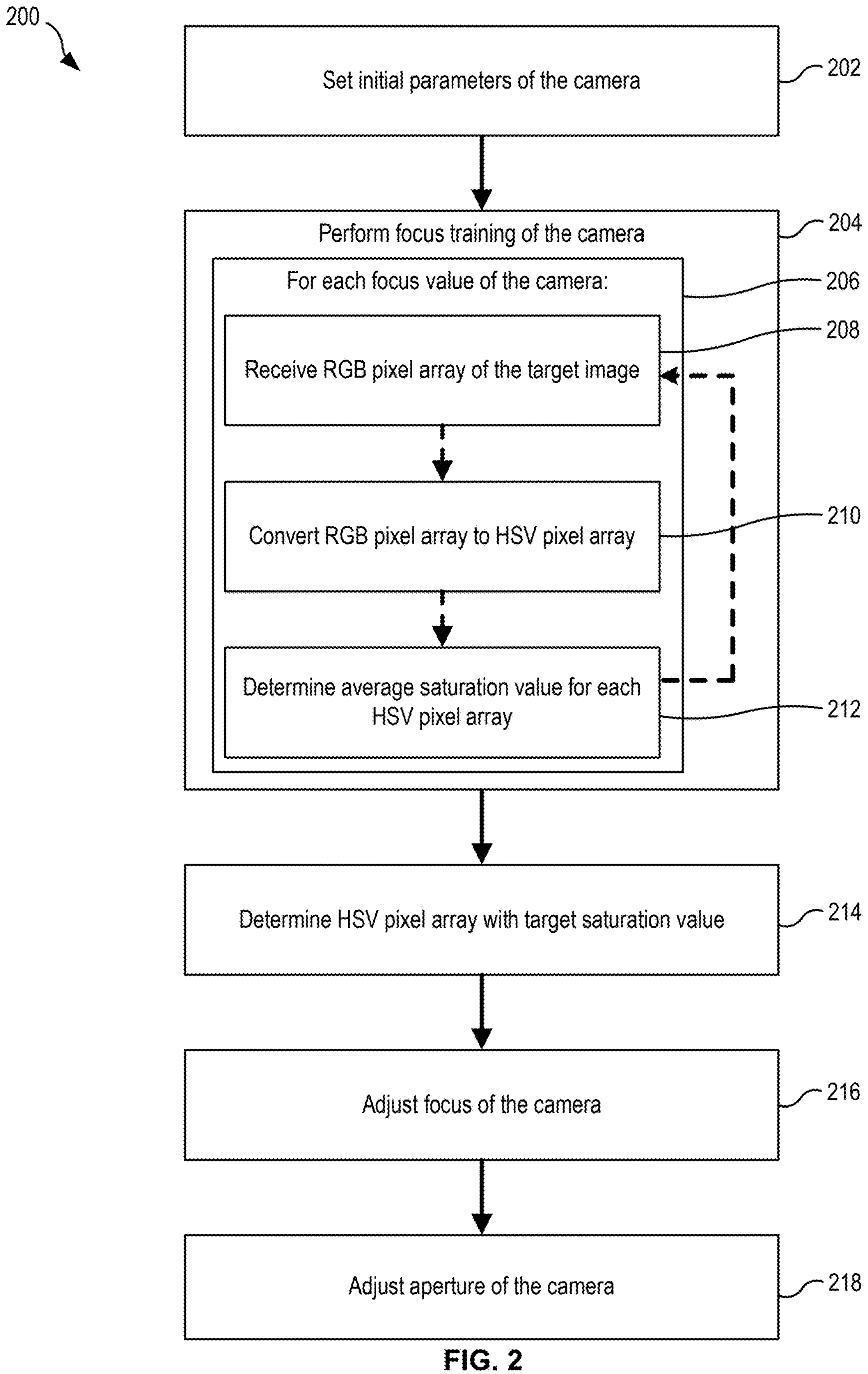
FIG. 2 illustrates an example flow diagram for adjusting camera settings, according to an embodiment of the present disclosure.

The resolution of the camera 120 can be slightly different from a frequency of elements in the target image 122. For example, the resolution of the camera 120 for the portion of the camera's image containing the target image may be 142 pixels by 142 pixels while the target image 122 has a checkerboard of 150 rows and 150 columns of alternating white and black squares. In some examples, the resolution of the camera 120 for the portion of the camera's image containing the target image may have a resolution that is 80-120% of the element frequency of the target image 122. In some examples, a particular dimension of the resolution of the camera 120 for the portion of the camera's image containing the target image may have a dimension that is 80-120% of the element frequency in a dimension of the target image 122. FIG. 2 illustrates an example target image 122 that is a checkerboard. Other types of target images 122 can also be used. The RGB pixel arrays 124 can be received by a computer system and used for further calculations and determinations.

The difference in the resolution of the camera 120 for the portion of the camera's image containing the target image from the element frequency of the target image 122 can cause an interference pattern because of an aliasing effect. The interference pattern can be generated via aliasing effects due to the mismatch in sampling by the digital camera sensor and the element frequency of the target sensor 122. As described herein, the aliasing effects can be used to determine the proper or target focus value for the camera 120.

The camera 120 can generate a set of RGB pixel arrays 124 that each have a different focus value. Although lens are physical and geometrical objects that enable a continuous number of focus values (for example, an infinite or near infinite number of focus values), oftentimes the lens are attached to mechanisms that enable a discrete set of focus values. For example, a stepper motor or a voltage-controlled liquid lens can be used to create a finite and discrete number of focus values for the lens of a camera. In some examples, the camera 120 has a discrete number of possible focus values and at least one RGB pixel array of the RGB pixel arrays 124 represents each discrete focus value of the camera 120. In some examples, the camera 120 is capable of a continuous range of the focus value. The RGB pixel arrays 124 generated by a camera with a continuous range of focus values can include a large number of RGB pixel arrays 124 that can be representative of the continuous range of focus values. For example, the number of RGB pixel arrays 124 may include hundreds, thousands, millions, or more, or in between number of RGB pixel arrays 124 with different focus values of the camera 120.

At 104, training the camera can include a set of HSV pixel arrays 126 being generated from the set of RGB pixel arrays 124. The set of HSV pixel arrays 126 can have a one-to-one correspondence with the set of RGB pixel arrays 124. In some examples, the set of HSV pixel arrays 126 is generated with a one-to-one correspondence to a subset of the RGB pixel arrays 124. The subset of RGB pixel arrays 124 may not include redundant or substantially similar RGB pixel arrays generated by the camera 120. The hue of the HSV pixel relates to the shade of the color. The saturation of the HSV pixel relates to the purity of the color. A saturation of zero (or 0%) can indicate the color is gray. A saturation of one (or 100%) can indicate that the color is purely that color. The value refers to a brightness or intensity of the color. A value of zero can indicate that the color is black. A value of one can indicate that the color is white or the color is at a maximum brightness and not darkened by black at all. In some examples, the HSV pixel arrays can be generated to only include pixels associated with the image of the target image 122.

At 106, training the camera can include determining an average saturation value for each HSV pixel array. Determining an average saturation value for each HSV pixel array can also be referred to as determining an average value for the saturation array corresponding to each of the HSV pixel arrays. Determining an average saturation value can be used to minimize the effects of certain types of noise in the sensor or image captured by the sensor. For example, white noise can be minimized by taking an average saturation value for the HSV pixel array. Determining an average saturation value for each HSV pixel array can also include normalizing the average saturation value for each HSV pixel array. After all average saturation values for each HSV pixel array has been determined, the average saturation values can be normalized based on the range of average saturation values. Normalizing the average saturation values for the HSV pixel arrays can eliminate scale dependencies of saturation. This can also be used to minimize differences between cameras with the same make and model that nonetheless have slight differences due to manufacturing imperfections. Using a normalization process for the average saturation value for each HSV pixel array enables each camera to be normalized compared to the camera's own lens and other characteristics.

At 108, training the camera can include determining (or identifying) an HSV pixel array with a target saturation value. The target saturation value can be a normalized target saturation value. This is especially important for target saturation values related to multiple targets as described in relation to FIG. 6. The target saturation value can correspond to an average saturation value for the HSV pixel arrays 126. In some examples, the total saturation value can be a greatest average saturation value for the HSV pixel arrays 126. In some examples, the total saturation value can be a specific (or within a tolerance range of) a particular saturation value that is not necessarily the greatest average saturation value.

At 110, training the camera can include adjusting the focus value of the camera 120. The focus value of the camera 120 can be adjusted based on the focus value associated with the HSV pixel array (and corresponding RGB pixel array) with the target saturation value.

In some examples, an aperture value of the camera 120 can be set prior to the process for adjusting the focus value described above. Setting the aperture value of the camera 120 to a target aperture value can assist in properly determining the appropriate focus value of the camera 120 because the aperture value can have a minor effect on the focus value of the camera 120 due to its f-number change. It may not be important to tune the aperture value of the camera 120 to the final aperture value prior to adjusting the focus value of the camera 120 but having the aperture value of the camera 120 within a nominal range of the final aperture value can assist in properly determining the appropriate focus value of the camera 120 for a particular working distance 121. The aperture value of the camera 120 can affect the brightness of images captured by the camera 120 as well as affect the depth-of-field of the camera 120. The aperture value of the camera 120 can be set to a target aperture value. In some examples, the process described above can include determining the target aperture value. For example, environmental conditions for a field-of-view of the camera 120 when deployed can be determined. The environmental conditions can inform what an appropriate brightness for the camera 120 would be. When the camera 120 is viewing the target image 122, the aperture value of the camera 120 can be adjusted to match the appropriate brightness level from the environmental conditions.

In some examples, the aperture value of the camera 120 can be adjusted after the process for adjusting the focus value described above. Once the focus value for the camera 120 has been set such that the focus value of the camera 120 is locked in or finalized, the aperture value of the camera 120 can be adjusted to lock in a finalized aperture value of the camera 120. A target aperture value for the camera 120 can be determined based on the brightness value (for example, the "Value" of Hue-Saturation-Value) of the HSV pixel arrays. A target image brightness level for objects/the scene at the working distance 121 corresponding the focus value of the camera 120 can be determined either before or after adjusting the focus value of the camera 120. For example, environmental conditions for a field-of-view of the camera 120 when deployed can be determined. The environmental conditions can inform what an appropriate brightness of the target image 122 for the camera 120 would be. When the camera 120 is viewing the target image 122, the aperture value of the camera 120 can be adjusted to match the appropriate brightness level from the environmental conditions. Therefore, after the focus value of the camera 120 has been finalized. The aperture value of the camera 120 can be adjusted to correspond to the target brightness value.

As described herein, the aperture value of the camera 120 can affect the brightness level of the target image 122 in the image captured by the camera. The aperture value of the camera 120 can also affect the depth-of-field of the camera 120 when capturing an image. The depth-of-field affects what portions of the image captured by the camera are within an appropriate or desirable level of focus. Adjusting the aperture value of the camera 120 can also increase or decrease the depth-of-field of the camera 120 to increase or decrease the amount of the image captured by the camera 120 that is within an appropriate or desirable level of focus.

FIG. 2 illustrates a flow diagram 200 of techniques relating to adjusting camera settings as described herein. At a high level, 1) initial parameters of the camera can be set, 2) focus training can be performed on the camera to determine a proper focus for the camera, 3) the focus of the camera can be adjusted, and 4) the aperture of the camera can be adjusted. The techniques described herein relate to the techniques described in relation to FIG. 1.

At block 202, initial parameters of the camera can be set. The initial parameters of the camera can be set in relation to a target image. In some examples, the target image has certain brightness characteristics. For example, the target image can be on a digital screen (with a particular resolution) with a particular image brightness. The digital screen can have a calibrated lux value. Similarly, the digital screen can have a particular illuminance. In some examples, the target image not a digital screen. For example, the target image can be a printed. In this way, the target image can be an analog pattern (or a near analog pattern) that is not displayed on a digital screen. In setting the initial parameters of the camera, an aperture value of the camera can be set such that the brightness of the target image is within a target range. The target range for the image brightness can be determined empirically based on target conditions for the camera when deployed in a target environment. Similarly, the aperture value of the camera can be set such that the depth-of-field of the camera in relation to the target image is within a target range. Similarly, the target range for the depth-of-field can be determined empirically based on target conditions for the camera when deployed in a target environment.

At block 204, focus training can be performed by the camera and/or a related computer. This process is also described in relation to FIG. 1. At block 206, an algorithm can be performed for each focus value of the camera in order to output HSV pixel arrays to be used in determining the focus of the camera. At block 208, the camera can capture an RGB pixel array of the target image. The RGB pixel array can be sent to a computer system (either on the camera itself or on a connected computer system) to be processed. At block 210, the RGB pixel array can be converted into an HSV pixel array. Any suitable algorithm for converting an RGB pixel array to an HSV pixel array can be used. At block 212, the average saturation value for each HSV pixel array can be determined.

At block 214, an HSV pixel array corresponding to a target saturation value can be determined. The target saturation value can be a normalized target saturation value based on the range of average saturation values across the generated HSV pixel arrays. At block 216, the focus value of the camera can be adjusted based on the HSV pixel array corresponding to the target saturation value (and/or to the corresponding RGB pixel array).

At block 218, the aperture value of the camera can be adjusted after the process for adjusting the focus value described above. Once the focus value for the camera has been set such that the focus value of the camera is locked in or finalized, the aperture value of the camera can be adjusted to lock in a finalized aperture value of the camera. A target aperture value for the camera can be determined based on the brightness value (for example, the "Value" of Hue-Saturation-Value) of the HSV pixel arrays. A target image brightness level for objects/the scene at the working distance corresponding the focus value of the camera can be determined either before or after adjusting the focus value of the camera. Adjusting the aperture of the camera prior to adjusting the focus value of the camera can be referred to setting the aperture with coarse tolerance. In some examples, adjusting the aperture prior to adjusting the focus value of the camera can fix the f-number of the aperture and determine a depth-of-field at the working distance. Without adjusting the aperture (for example, the f-number) the focusing procedure described herein may not be able to reach the target saturation value. Adjusting the focus of the camera after adjusting the focus value of the camera can be referred to as setting the aperture with tight tolerance. Adjusting the aperture of the camera can also be instrumental in adjusting the camera to have a target depth-of-field. For example, environmental conditions for a field-of-view of the camera when deployed can be determined. The environmental conditions can inform what an appropriate brightness of the target image for the camera would be. When the camera is viewing the target image, the aperture value of the camera can be adjusted to match the appropriate brightness level from the environmental conditions. Therefore, after the focus value of the camera has been finalized. The aperture value of the camera can be adjusted to correspond to the target brightness value. In some examples, the environmental conditions can be adjusted in other ways. For example, object motion blur and ambient lighting of the target image can be configured via an exposure time, a camera gain, or strobed illuminators.

Figure 3:
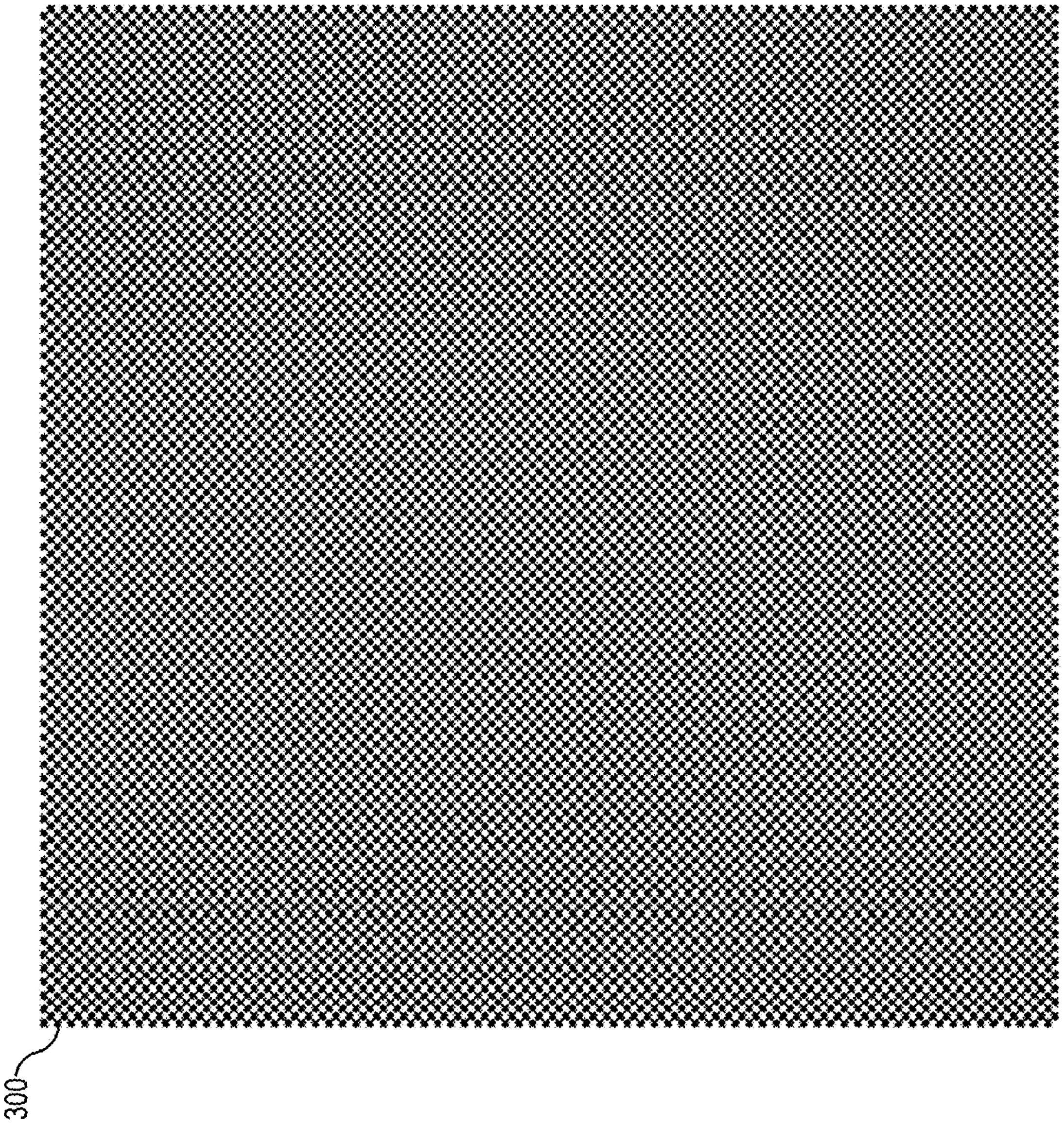
FIG. 3 illustrates an example target image, according to an embodiment of the present disclosure.

FIG. 3 illustrates an example target image 300 (for example, the target image 122 of FIG. 1). This example of a target image 300 is a checkerboard pattern. As described herein, the frequency of the elements of the target image (for example, a black square or a white square in the checkerboard is an element) should be slightly different from the resolution of the camera (for example, the camera 120 of FIG. 1) for the appropriate portion of the image captured by the camera and corresponding to the target image. Therefore, cameras with different settings and properties can be trained with different target images with different frequencies of elements. Similarly, training an equivalent camera (for example, the same model of camera) for the same focus value at different working distances can be trained with different target images with different frequencies of elements. The use of different target images may arise because the resolution of the camera for the target image can be reliant on the settings and properties of the camera as well as the working distance of the target image.

The image sensor of the camera determines the resolution of the images captured by the camera. When the resolution of the image sensor of the camera is slightly different from the frequencies of elements in the target image, an aliasing effect can be noticed in the image captured by the camera. Artifacts of repeating patterns not seen in the target image can be detected in the image captured by the camera. This happens because the sampling for the pixels of the image sensor does not have a sufficiently high enough frequency to match the actual target image.

Figure 4:
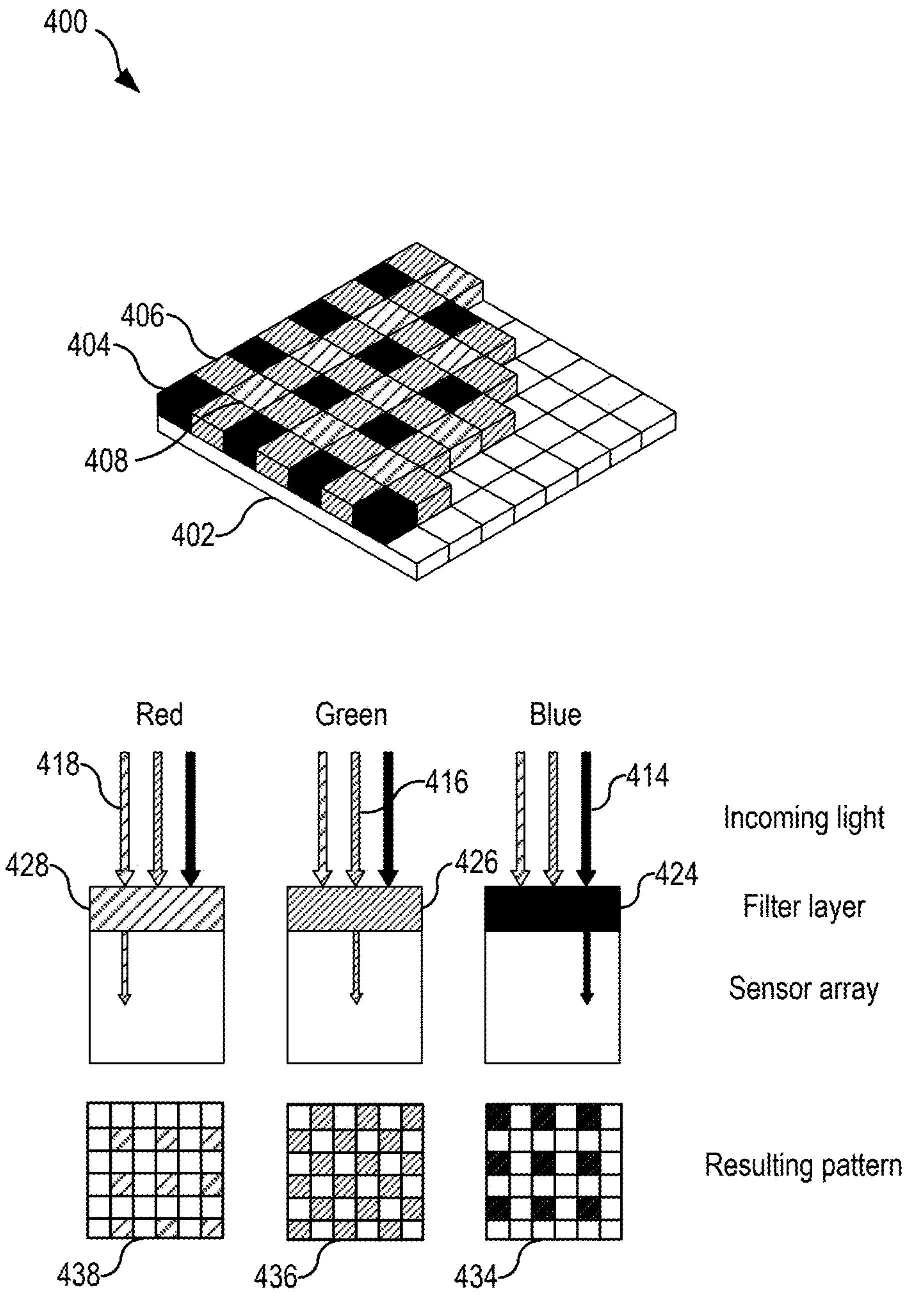
FIG. 4 illustrates diagrams related to a color filter of a camera, according to an embodiment of the present disclosure.

FIG. 4 illustrates an example diagram 400 related to a color filter of a camera. The example color filter used in this diagram is a Bayer RGB color filter, but any color filter is suitable. Each pixel of resolution for the image of the camera is represented by a two-by-two set of pixels related to particular colors (which can be referred to as color pixels or sub-pixels). For example, for a camera that captures images with a resolution of 2000 pixels by 2000 pixels, the number of sub-pixels actually captured by the image sensor 402 can be 4000 sub-pixels by 4000 sub-pixels. Each pixel of the image can use multiple values determined by the sub-pixels to determine the RGB value to be assigned to the pixel. Any appropriate algorithm to determine the RGB values of a pixel from the sub-pixels can be used.

The pixels of the image correspond to two-by-two sets of sub-pixels of the image sensor 402. The Bayer RGB color filter can organize the two-by-two sets of sub-pixels to include a blue sub-pixel 404 in the upper left corner adjacent to two green sub-pixels 406 in the upper right corner and bottom left corner. The bottom right corner can be a red sub-pixel 408. Each sub-pixel can include a filter layer meant to substantially filter out all other colors of light. For example, a green sub-pixel 406 can have a filter layer 426 that substantially filters out all light that is not green light 416. In this way, this forms resulting pattern of green sub-pixels 438. Likewise, a blue sub-pixel 404 can have a filter layer 424 that substantially filters out all light that is not blue light 414. This forms resulting pattern of blue sub-pixels 434. Likewise, a red sub-pixel 408 can have a filter layer 428 that substantially filters out all light that is not red light 418. This forms resulting pattern of red sub-pixels 438. The image sensor 402 can determine a reading for the particular color of light relating to the sub-pixel. The image sensor 402 can use the readings for the sub-pixels to determine appropriate RGB values for pixels of the image. The RGB values for the pixels of the image are determined using a de-mosaicing algorithm on the corresponding sub-pixels. The de-mosaicing algorithm can cause the color aliasing effect described herein.

Figure 5:
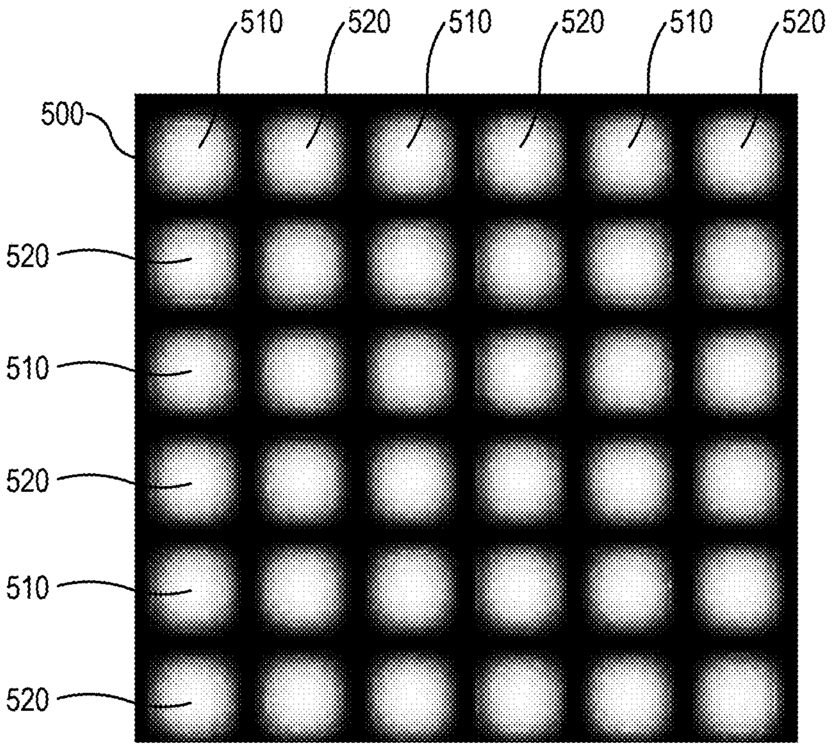
FIG. 5 illustrates an example aliasing pattern, according to an embodiment of the present disclosure.

FIG. 5 illustrates an example aliasing pattern 500. As described in relation to FIGS. 3-4, the color sub-pixels (for example, the color sub-pixels 404, 406, 408) of the color filter of a camera (for example, the camera 120 of FIG. 1) can cause an aliasing pattern due to the insufficient resolution of the camera to sample the elements of the target image (for example, the target image 300 of FIG. 3) properly. The example aliasing pattern 500 is shown in gray-scale where black shows low saturation for a color while grey and white represent a gradient of saturation of a color. The aliasing pattern detected by the camera has a color aliasing pattern. The black portions of the example aliasing pattern 500 represent shades of gray with minimal saturation. The white and gray portions of the example aliasing pattern represent shades of colors. In some examples (for example, using a Bayer RGB color filter), the white portions 510 of the color aliasing pattern can be a shade of green (based on the green sub-pixels 406 of FIG. 4) while the white portions 520 can be a shade of magenta (based on the red sub-pixels 408 and the blue sub-pixels 404 of FIG. 4). In this way, the color-aliasing image captured by the camera has alternating gradients of saturated green and magenta separated by unsaturated gray.

As described in relation to FIG. 1, the color-aliasing pattern detected by the camera can be an RGB pixel array. A HSV pixel array can be generated based on the captured RGB pixel array. The black and white example aliasing pattern 500 can also be used to represent the saturation values of the HSV pixel array. For example, the grays from lack of saturation represent the black portions of the example aliasing pattern 500 while the white portions represent the gradients of saturated colors.

Figure 6:
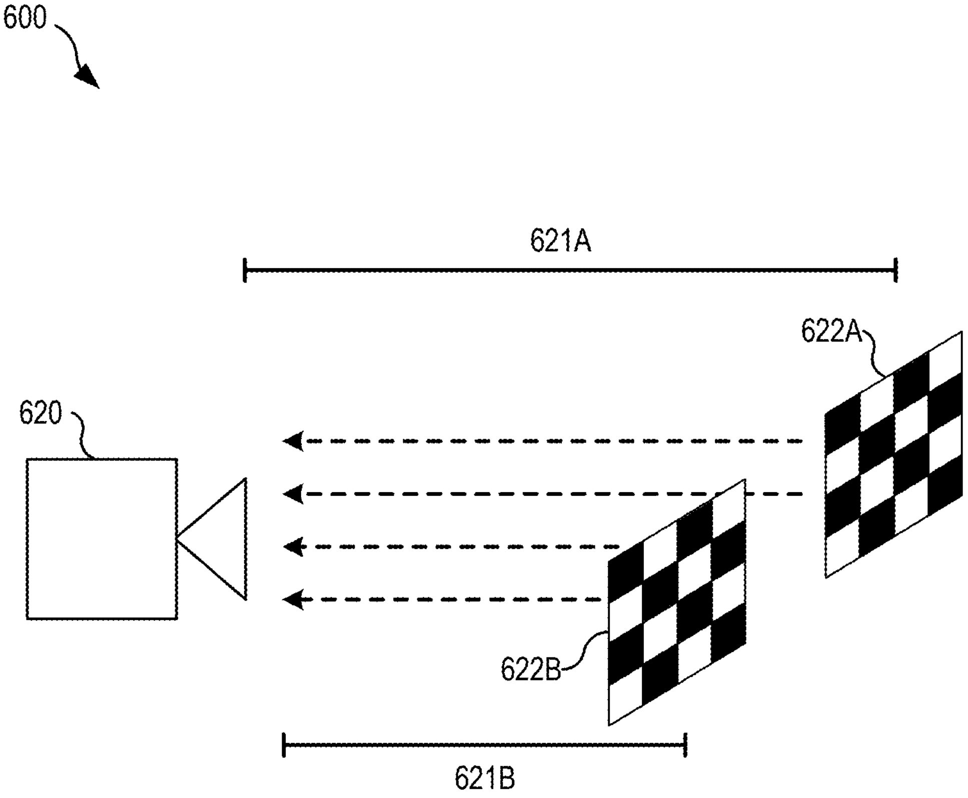
FIG. 6 illustrates an example diagram for adjusting the focus of a camera, according to an embodiment of the present disclosure.

FIG. 6 illustrates an example block diagram for adjusting the focus of a camera. In this example, two target images 622A, 622B (for example, target image 122 of FIG. 1) are within the field-of-view of the camera 620 (for example, camera 120 of FIG. 1). The first target image 622A can be at a first working distance 621A from the camera 620 and the second target image 622B can be at a second working distance 621B from the camera 620. The techniques for adjusting the focus of the camera described in relation to FIG. 1 can also be used when multiple target images are used to train the camera. In this example, adjusting the focus of the camera 620 can be arranged such that the focus of the camera 620 at the first working distance 621A and the second working distance 621B are adequate such that the depth of field for the camera 620 encompasses both the first working distance 621A and the second working distance 621B. Such a setup can be preferable when the camera 620 is being deployed in an environment where there is a target area (for example, between the first working distance 621A and the second working distance 621B) that has a minimum focus requirement. Similarly, such a setup can be preferable when the camera 620 is being deployed in an environment where there are two target images being used as depth-of-field boundaries to generate images with balanced focus at the depth-of-field boundaries. Having balanced focus at the depth-of-field boundaries can be important so that uniform image focus is provided between the two target images at the depth-of-field boundaries.

The camera 620 can generate a first set of RGB pixel arrays based on the target image 622A and a second set of RGB pixel arrays based on the target image 622B simultaneously (because both target images 622A, 622B can be with the field-of-view of the camera). An RGB pixel array of the first set of RGB pixel arrays can correspond to an RGB pixel array of the second set of RGB pixel arrays, potentially with a one-to-one correspondence. Each corresponding pair of RGB pixel arrays from the first set and the second set can correspond to a focus value of the camera 620. Similarly to the process described in relation to FIGS. 1-2, the RGB pixel arrays can be generated frame by frame in real-time. A first set of HSV pixel arrays can be generated based on the first set of RGB pixel arrays as described in relation to FIG. 1. Likewise, a second set of HSV pixel arrays can be generated based on the second set of RGB pixel arrays. The average saturation value for each HSV pixel array of the first set and the second set of HSV pixel arrays can be determined. The first set of HSV pixel array (corresponding to target image 622A) average saturation values can be normalized against each other. Similarly, the second set of HSV pixel array (corresponding to target image 622B) average saturation values can be normalized against each other. For example, the average saturation values for the first set of HSV pixel arrays can be normalized to between 0 and 1. Likewise, the average saturation values for the second set of HSV pixel arrays can be normalized to between 0 and 1. A corresponding pair of HSV pixel arrays from the first set and the second set can be determined to each reach a minimum normalized target saturation value. For example, In some examples, the corresponding pair of HSV pixel arrays that have the greatest average saturation value across the corresponding pair of HSV pixel arrays corresponds to the target saturation value. The normalized target saturation values can be used as proxies for adequate levels of focus. Ideally (and as described in relation to FIGS. 1-2) the normalized average saturation value of 1 for a single image system would lead to optimal focus at the corresponding working distance. However, when there are two working distances as discussed in relation to FIG. 6, the normalized average saturation values for the first working distance 621A and the second working distance 621B will not both be 1 for the same focus value of the camera.

Adjusting the focus value of the camera 620 using two target images 622A, 622B can improve the focus at a range of distances between the first working distance 621A and the second working distance 621B. In this way, the use of two target images 622A, 622B can also be used to determine if focus is adequate within an area within the field-of-view of the camera 620. For example, the farther target image 622A can be used to ensure that focus at the first working distance 621A are within acceptable parameters (for example, a minimum normalized target saturation value or a minimum focus value). Likewise, the closer target image 622B can be used to ensure that focus at the second working distance 621B are within acceptable parameters. Adjusting the focus value of a camera 620 based on multiple distances can be difficult for other methods of determining a focus value of a camera 620. For example, it is difficult for a technician to ensure that the focus at a first point in the image captured by the camera 620 at a first working distance 621A is adequate while simultaneously to ensure that the focus at a second point in the image captured by the camera 620 at a second working distance 621B is adequate.

In some examples, the initial parameters of the camera 620 can be set as described in relation to block 202 of FIG. 2. The aperture value of the camera 620 can be set such that the brightness levels of target images 622A, 622B meet a minimum threshold. As described before, the target images 622A, 622B can be displayed on digital displays with particular luminance and/or lux characteristics. Likewise, after the training of the camera 620 as described above in relation to FIG. 6 (and similar to the focus training of FIG. 2 at block 204), the aperture of the camera 620 can be adjusted. The aperture value of the camera 620 can be adjusted such that the brightness levels of target images 622A, 622B exceed a minimum brightness threshold after the focus training has been completed to determine a focus value for the camera.

Figure 7:
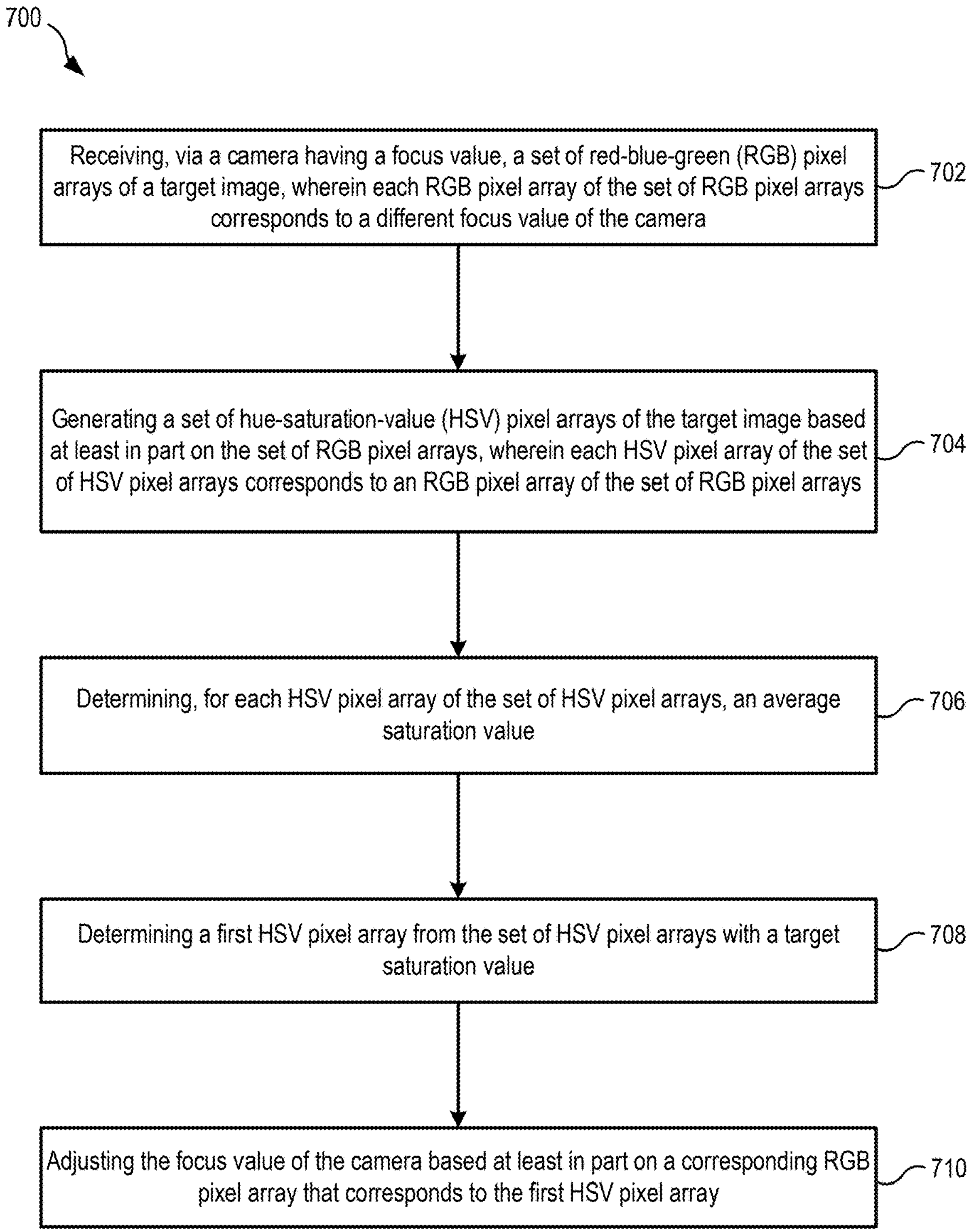
FIG. 7 illustrates an example flow diagram for adjusting the focus of a camera, according to an embodiment of the present disclosure.

FIG. 7 illustrates an example process 700 for adjusting the focus value of a camera (for example, the camera 120 of FIG. 1). One or more parts of process 700 can be performed by a The process 700 can include adjusting the focus value of a camera using saturation values of images taken by the camera as described further in relation to FIG. 1.

Some or all of the process associated with process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Likewise, some or all of the process associated with process 700 can involve a technician causing the operations to occur. For example, a technician can adjust the focus value of the camera.

At block 702, a set of RGB pixel arrays of a target image can be received via a camera having a focus value. Each RGB pixel array of the set of RGB pixel arrays can correspond to a different focus value of the camera. The camera can have a color filter that causes aliasing when viewing the target image. The target image can be displayed on a digital display. The color filter can be a Bayer filter or any other suitable color filter. The target image can be a checkerboard pattern at a working distance. The pattern frequency of the checkerboard pattern can be between 80% and 120% of a resolution of the camera at the working distance. A pattern frequency of the checkerboard pattern can be approximately, but not the same as, a resolution of the camera at the working distance. In some examples, the focus value can be a focal length of the camera. In some examples, the focus value can be an effective focal length of the camera. In some examples, the focus value can be a focal length of a multi-lens camera. In some examples, the focus value can be a focal length of a lens or based on focal lengths for multiple lens of a multi-lens camera. In some examples, the set of red-blue-green pixel arrays of the target image can correspond to 90% of possible focus values of the camera.

At block 704, a set of HSV pixel arrays of the target image can be generated based at least in part on the set of RGB pixel arrays. Each HSV pixel array of the set of HSV pixel arrays can correspond to an RGB pixel array of the set of RGB pixel arrays.

At block 706, an average saturation value can be determined for each HSV pixel array of the set of HSV pixel arrays. At block 708, a first HSV pixel array can be determined from the set of HSV pixel arrays with a target saturation value. The target saturation value can be a greatest average saturation value of the set of HSV pixel arrays. At block 710, the focus value of the camera can be adjusted based at least in part on a corresponding RGB pixel array that corresponds to the first HSV pixel array.

In some examples, the target image can be located at a first working distance. Additionally, receiving, via the camera, the set of RGB pixel arrays of the target image can include simultaneously receiving, via the camera, a second set of RGB pixel arrays of a second target image located at a second working distance. Each RGB pixel array of the second set of RGB pixel arrays can correspond to an RGB pixel array of the set of RGB pixel arrays. The process 700 can further include generating a second set of HSV pixel arrays of the second target image based at least in part on the second set of RGB pixel arrays. Each HSV pixel array of the second set of HSV pixel arrays can correspond to an RGB pixel array of the second set of RGB pixel arrays. The process 700 can further include determining, for each HSV pixel array of the second set of HSV pixel arrays, a second average saturation value. The second HSV pixel array can correspond to the first HSV pixel array. The process 700 can further include determining a second HSV pixel array from the second set of HSV pixel arrays with a second target saturation value. Adjusting the focus value of the camera can be further based at least in part on a second corresponding RGB pixel array that corresponds to the second HSV pixel array. Adjusting the focus value of the camera can be further based at least in part on a target depth-of-field related to the first target saturation value at the first working distance and the second target saturation value at the second working distance.

In some examples, the process 700 can further include determining a target brightness value for the target image. In some examples, the process 700 can further include adjusting an aperture value of the camera to correspond to the target brightness value after adjusting the focus value of the camera. In some examples, the process 700 can further include determining a profile of the camera including one or more of: a model of the camera, a type of the camera, a lens of the camera, and an image sensor of the camera.

In some examples, the process 700 can include a second camera having a second focus value. In some examples, the process 700 can include receiving, via the second camera, a second set of RGB pixel arrays of the target image. Each RGB pixel array of the second set of RGB pixel arrays can correspond to a different focus value of the second camera. In some examples, the process 700 can include generating a second set of HSV pixel arrays of the target image based at least in part on the second set of RGB pixel arrays. Each HSV pixel array of the second set of HSV pixel arrays can correspond to an RGB pixel array of the second set of RGB pixel arrays. In some examples, the process 700 can include determining a second HSV pixel array from the second set of HSV pixel arrays with a second target saturation value. In some examples, the process 700 can include adjusting the second focus value of the second camera based at least in part on a second corresponding RGB pixel array that corresponds to the second HSV pixel array. In some examples, a lens of the camera can be different from a second lens of the second camera. In some examples, an image sensor of the camera can be different from a second image sensor of the second camera.

Figure 8:
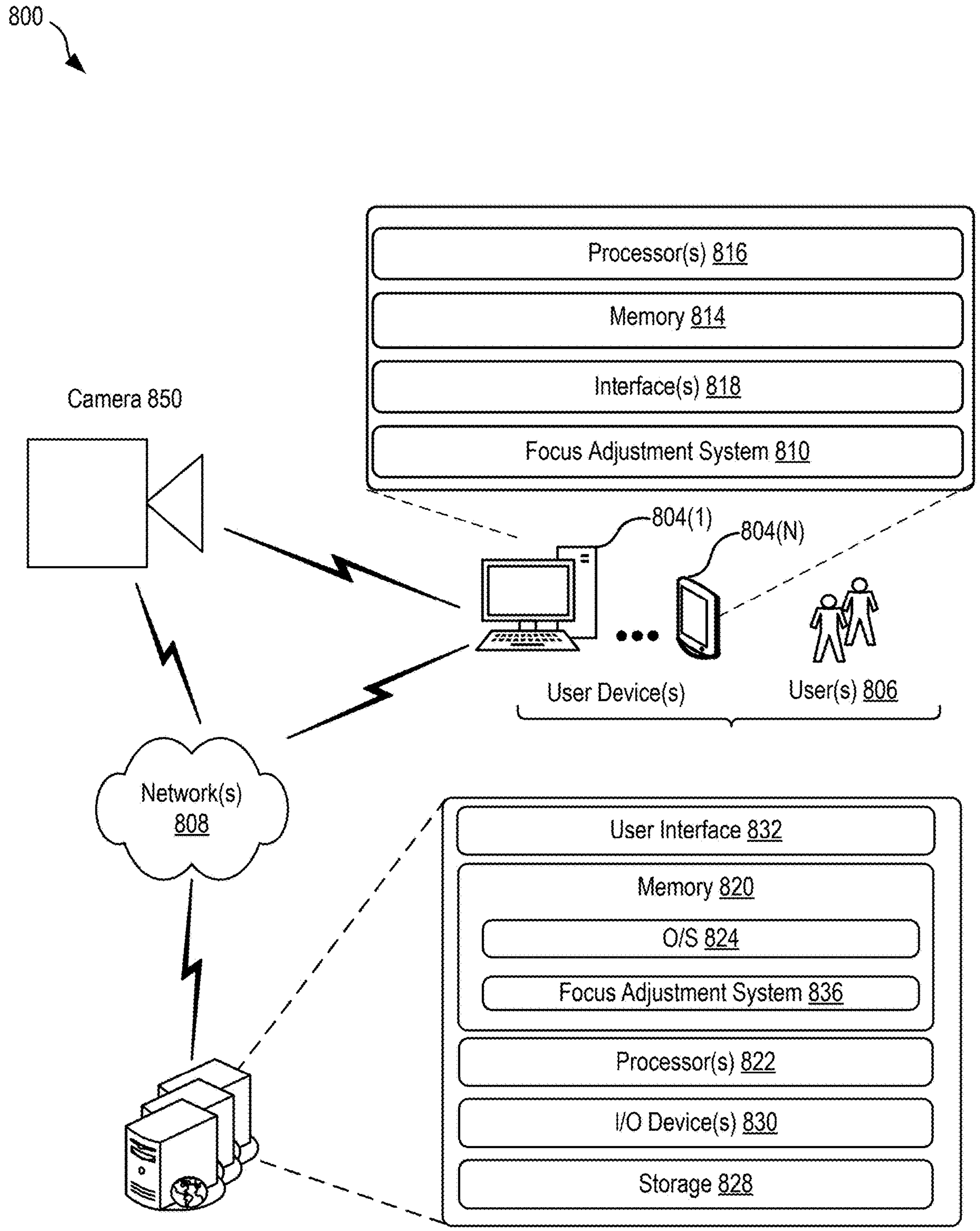
FIG. 8 illustrates an example schematic architecture for implementing techniques relating to generating selection models, according to at least one example.

FIG. 8 illustrates an example schematic architecture 800 for implementing techniques relating to camera focus adjustment described herein, according to at least one example. The architecture 800 may include a computer system 802 (e.g., the computer system described herein) in communication with one or more user devices 804(1)-804(N) via one or more networks 808 (hereinafter, "the network 808"). Similarly, both the computer system 802 and the one or more user devices 804(1)-804(N) can be in communication with a camera 850 (for example, the camera 120 of FIG. 1) which captures the images of the target image (for example, the target image 122 of FIG. 1).

The computer system 802 may include one or more computer system computers, perhaps arranged in a cluster of servers or as a server farm, and may host web service applications. The function of the computer system 802 may be implemented a cloud-based environment such that individual components of the computer system 802 are virtual resources in a distributed environment.

The computer system 802 may include at least one memory 820 and one or more processing units (or processor(s)) 822. The processor 822 may be implemented as appropriate in hardware, computer-executable instructions, software, firmware, or combinations thereof. Computer-executable instruction, software, or firmware implementations of the processor 822 may include computer-executable or machine-executable instructions written in any suitable programming language to perform the various functions described. The memory 820 may include more than one memory and may be distributed throughout the computer system 802. The memory 820 may store program instructions that are loadable and executable on the processor(s) 822, as well as data generated during the execution of these programs. Depending on the configuration and type of memory including the computer system 802, the memory 820 may be volatile (such as RAM and/or non-volatile (such as read-only memory ("ROM"), flash memory, or other memory)). The memory 820 may include an operating system 824 and one or more application programs, modules, or services for implementing the features disclosed herein including at least a selection system 836. The focus adjustment system 836 can be the part of the computer system 802 that performs all or some portions of the techniques related to adjusting focus values and aperture values of the camera 850 as described herein. In some examples, the camera 850 can be integrated into or in communication with the computer system 802.

The computer system 802 may also include additional storage 828, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 828, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 802 and/or part of the user device 804.

The computer system 802 may also include input/output (I/O) device(s) and/or ports 830, such as for enabling connection with a keyboard, a mouse, a pen, a voice input device, a touch input device, a display, speakers, a printer, or other I/O device.

In some examples, the computer system 802 may also include one or more user interface(s) 832. The user interface 832 may be utilized by an operator, curator, or other authorized user to access portions of the computer system 802. In some examples, the user interface 832 may include a graphical user interface, voice interfaces, web-based applications, programmatic interfaces such as APIs, or other user interface configurations.

The computer system 802 may also include a data store 801. In some examples, the data store 801 may include one or more databases, data structures, or the like for storing and/or retaining information associated with the computer system 802 and which, in some examples, may be accessible by the user devices 804.

Turning now to the details of the user device 804, the user device 804 may be operable by one or more users 806 to interact with the computer system 802. The user device 804 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 804(1) is illustrated as a desktop computer, while the user device 804(N) is illustrated as an example of a handheld mobile device.

The user device 804 may include a memory 814 and processor(s) 816. In the memory 814 may be stored program instructions that are loadable and executable on the processor(s) 816, as well as data generated during the execution of these programs. Depending on the configuration and type of user device 804, the memory 814 may be volatile (such as random access memory ("RAM")) and/or non-volatile (such as read-only memory (ROM), flash memory, etc.). The user device 804 can also include a focus adjustment system 810. The focus adjustment system 810 can be the part of the user device 804 that performs all or some portions of the techniques related to adjusting focus values and aperture values of the camera 850 as described herein. In some examples, the camera 850 can be integrated into or in communication with the user device 804.

The user device 804 may also include one or more interfaces 818 to enable communication with other devices, systems, and the like.

Figure 9:
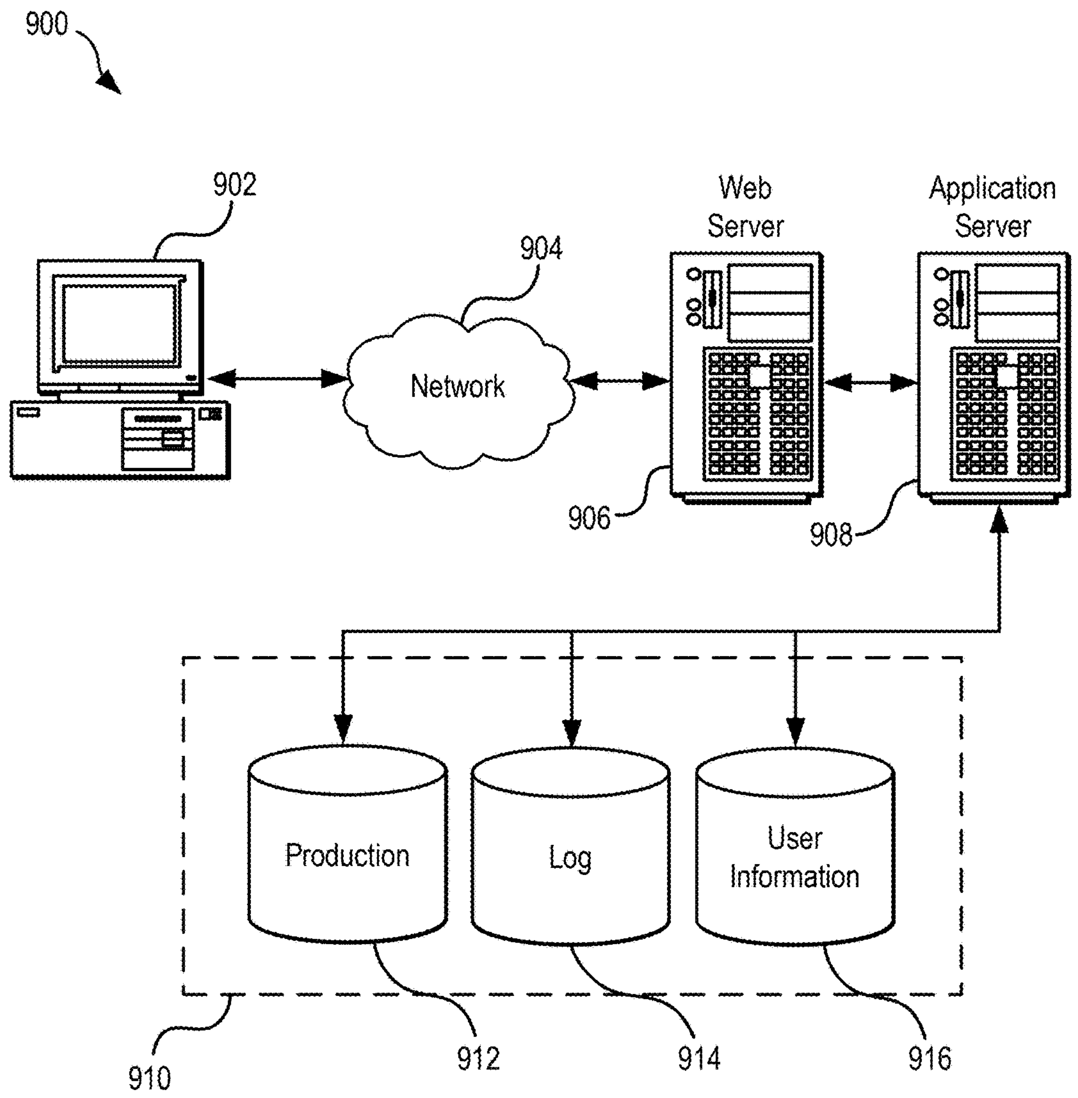
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 902. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 906 or other servers over the network 904 or other networks.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer-executable instructions that, when executed by one or more processors of a computer system, cause the computer system to perform operations comprising:

receiving, via a camera having a focus value, a set of red-blue-green (RGB) pixel arrays of a target image, wherein each RGB pixel array of the set of RGB pixel arrays corresponds to a different focus value of the camera;

generating a set of hue-saturation-value (HSV) pixel arrays of the target image based at least in part on the set of RGB pixel arrays, wherein each HSV pixel array of the set of HSV pixel arrays corresponds to an RGB pixel array of the set of RGB pixel arrays;

determining, for each HSV pixel array of the set of HSV pixel arrays, an average saturation value;

determining a first HSV pixel array from the set of HSV pixel arrays with a target saturation value; and adjusting the focus value of the camera based at least in part on a corresponding RGB pixel array that corresponds to the first HSV pixel array receiving, via a second camera having a second focus value, a second set of RGB pixel arrays of the target image, wherein each RGB pixel array of the second set of RGB pixel arrays corresponds to a different focus value of the second camera;

generating a second set of HSV pixel arrays of the target image based at least in part on the second set of RGB pixel arrays, wherein each HSV pixel array of the second set of HSV pixel arrays corresponds to an RGB pixel array of the second set of RGB pixel arrays;

determining a second HSV pixel array from the second set of HSV pixel arrays with a second target saturation value; and adjusting the second focus value of the second camera based at least in part on a second corresponding RGB pixel array that corresponds to the second HSV pixel array.

2. The one or more non-transitory computer-readable media of claim 1, wherein the target saturation value is a greatest average saturation value of the set of HSV pixel arrays.

3. The one or more non-transitory computer-readable media of claim 1, wherein the camera has a color filter that causes aliasing when viewing the target image.

4. The one or more non-transitory computer-readable media of claim 1, wherein the target image is a checkerboard pattern at a working distance, wherein a pattern frequency of the checkerboard pattern is between 80% and 120% of a resolution of the camera at the working distance.

5. A method, comprising receiving, via a camera having a focus value, a set of red-blue-green (RGB) pixel arrays of a target image, wherein each RGB pixel array of the set of RGB pixel arrays corresponds to a different focus value of the camera;

generating a set of hue-saturation-value (HSV) pixel arrays of the target image based at least in part on the set of RGB pixel arrays, wherein each HSV pixel array of the set of HSV pixel arrays corresponds to an RGB pixel array of the set of RGB pixel arrays;

determining, for each HSV pixel array of the set of HSV pixel arrays, an average saturation value;

determining a first HSV pixel array from the set of HSV pixel arrays with a target saturation value; and adjusting the focus value of the camera based at least in part on a corresponding RGB pixel array that corresponds to the first HSV pixel array;

receiving, via a second camera having a second focus value, a second set of RGB pixel arrays of the target image, wherein each RGB pixel array of the second set of RGB pixel arrays corresponds to a different focus value of the second camera;

generating a second set of HSV pixel arrays of the target image based at least in part on the second set of RGB pixel arrays, wherein each HSV pixel array of the second set of HSV pixel arrays corresponds to an RGB pixel array of the second set of RGB pixel arrays;

determining a second HSV pixel array from the second set of HSV pixel arrays with a second target saturation value; and adjusting the second focus value of the second camera based at least in part on a second corresponding RGB pixel array that corresponds to the second HSV pixel array.

6. The method of claim 5, wherein the target saturation value is a greatest average saturation value of the set of HSV pixel arrays.

7. The method of claim 5, wherein the target image is located at a first working distance, and wherein receiving, via the camera, the set of RGB pixel arrays of the target image includes simultaneously receiving, via the camera, a second set of RGB pixel arrays of a second target image located at a second working distance, wherein each RGB pixel array of the second set of RGB pixel arrays of the second target image corresponds to a respective RGB pixel array of the set of RGB pixel arrays.

8. The method of claim 7, further comprising:

generating a second set of HSV pixel arrays of the second target image based at least in part on the second set of RGB pixel arrays of the second target image, wherein each HSV pixel array of the second set of HSV pixel arrays of the second target image corresponds to a respective RGB pixel array of the second set of RGB pixel arrays of the second target image;

determining, for each HSV pixel array of the second set of HSV pixel arrays of the second target image, a second average saturation value; and determining the second HSV pixel array from the second set of HSV pixel arrays of the second target image with the second target saturation value, wherein the second HSV pixel array corresponds to the first HSV pixel array of the target image; and wherein adjusting the focus value of the camera is further based at least in part on a target depth-of-field related to the target saturation value at the first working distance and the second target saturation value at the second working distance.

9. The method of claim 5, further comprising:

determining a target brightness value for the target image; and after adjusting the focus value of the camera, adjusting an aperture value of the camera to correspond to the target brightness value.

10. The method of claim 5, further comprising:

prior to receiving, via the camera, the set of RGB pixel arrays of the target image, adjusting an aperture value of the camera to correspond to a target brightness value associated with the target image.

11. The method of claim 5, wherein the camera has a color filter that causes aliasing when viewing the target image.

12. The method of claim 11, wherein the color filter is a Bayer filter.

13. The method of claim 8, wherein the target image is a checkerboard pattern at a working distance, wherein a pattern frequency of the checkerboard pattern is between 80% and 120% of a resolution of the camera at the working distance.

14. A computer system, comprising:

a camera having a focus value;

a second camera having a second focus value;

one or more processors; and one or more memory storing instructions that, upon execution by the one or more processors, configure the computer system to:

receive, via the camera, a set of red-blue-green (RGB) pixel arrays of a target image, wherein each RGB pixel array of the set of RGB pixel arrays corresponds to a different focus value of the camera;

generate a set of hue-saturation-value (HSV) pixel arrays of the target image based at least in part on the set of RGB pixel arrays, wherein each HSV pixel array of the set of HSV pixel arrays corresponds to an RGB pixel array of the set of RGB pixel arrays;

determine, for each HSV pixel array of the set of HSV pixel arrays, an average saturation value;

determine a first HSV pixel array with a greatest average saturation value;

adjust the focus value of the camera based at least in part on a corresponding RGB pixel array that corresponds to the first HSV pixel array;

receive, via the second camera, a second set of RGB pixel arrays of the target image, wherein each RGB pixel array of the second set of RGB pixel arrays corresponds to a different focus value of the second camera;

generate a second set of HSV pixel arrays of the target image based at least in part on the second set of RGB pixel arrays, wherein each HSV pixel array of the second set of HSV pixel arrays corresponds to an RGB pixel array of the second set of RGB pixel arrays;

determine a second HSV pixel array from the second set of HSV pixel arrays with a second target saturation value; and adjust the second focus value of the second camera based at least in part on a second corresponding RGB pixel array that corresponds to the second HSV pixel array.

15. The computer system of claim 14, wherein the target image is a checkerboard pattern at a working distance, wherein a pattern frequency of the checkerboard pattern is between 80% and 120% of a resolution of the camera at the working distance.

16. The computer system of claim 14, wherein the focus value is a focal length of the camera.

17. The computer system of claim 14, wherein the target image is displayed on a digital display.

18. The computer system of claim 14, wherein a lens of the camera is different from a second lens of the second camera.

19. The computer system of claim 14, wherein an image sensor of the camera is different from a second image sensor of the second camera.

20. The computer system of claim 14, wherein the one or more memory store further instructions that, upon execution by the one or more processors further configure the computer system to determine a profile of the camera including one or more of: a model of the camera, a type of the camera, a lens of the camera, and an image sensor of the camera.

* * * * *